US008600350B2

(12) United States Patent
Hsu

(10) Patent No.: US 8,600,350 B2
(45) Date of Patent: Dec. 3, 2013

(54) PROTECTION SETTING METHOD AND PROTECTION RELEASING METHOD FOR PORTABLE DEVICE

(75) Inventor: Shih-Chan Hsu, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 582 days.

(21) Appl. No.: 12/437,620

(22) Filed: May 8, 2009

(65) Prior Publication Data

US 2009/0291711 A1    Nov. 26, 2009

(30) Foreign Application Priority Data

May 22, 2008    (TW) .............................. 97118868 A

(51) Int. Cl.
*H04M 1/66*    (2006.01)
*G06F 3/00*    (2006.01)
*G06F 7/04*    (2006.01)
*G06F 21/00*    (2013.01)

(52) U.S. Cl.
USPC ........... 455/411; 455/410; 715/743; 715/747; 726/26; 713/182

(58) Field of Classification Search
USPC .................. 455/410, 411, 566; 715/733–747
See application file for complete search history.

(56) References Cited

U.S. PATENT DOCUMENTS

| 6,041,410 | A  | * | 3/2000  | Hsu et al. ....................... 713/186 |
| 6,950,647 | B2 | * | 9/2005  | Ko ................................. 455/411 |
| 7,058,391 | B2 | * | 6/2006  | Tani ............................... 455/411 |
| 7,272,380 | B2 | * | 9/2007  | Lee et al. ....................... 455/410 |
| 7,805,128 | B2 | * | 9/2010  | Bentley et al. ................. 455/411 |
| 8,058,969 | B1 | * | 11/2011 | Lai et al. ....................... 340/5.52 |
| 2001/0039620 | A1 | * | 11/2001 | Berry et al. ................... 713/193 |
| 2002/0077079 | A1 | * | 6/2002  | Ishihara ........................ 455/410 |
| 2006/0107315 | A1 | * | 5/2006  | Fiske .............................. 726/17 |
| 2006/0234764 | A1 | * | 10/2006 | Gamo et al. ............... 455/552.1 |
| 2007/0250920 | A1 | * | 10/2007 | Lindsay ............................ 726/7 |
| 2008/0184360 | A1 | * | 7/2008  | Kornilovsky et al. .......... 726/17 |

FOREIGN PATENT DOCUMENTS

CN    1885977 A    12/2006

OTHER PUBLICATIONS

Chinese Patent Office, Office Action, 0810216CN, Apr. 7, 2011, 4 pages.

* cited by examiner

*Primary Examiner* — Matthew Sams
(74) *Attorney, Agent, or Firm* — Edell, Shapiro & Finnan, LLC

(57) ABSTRACT

The present invention provides a protection setting method and a protection releasing method for a portable device. The protection setting method comprises: selecting a lock function having a first unlocking condition, displaying a protection condition list including a plurality of protection conditions, selecting a protecting condition from the plurality of protecting conditions, and further setting the selected protection condition as a second unlocking condition for the lock function. When the portable device is locked, the protection releasing method comprises: displaying a password input window for entering a first unlocking input, detecting a second unlocking input, verifying whether the second unlocking input matches with the second unlocking condition, and verifying whether the first unlocking input matches with the first unlocking condition.

8 Claims, 6 Drawing Sheets

PROTECTION SETTING METHOD AND PROTECTION RELEASING METHOD FOR PORTABLE DEVICE

FIELD OF THE INVENTION

The present invention relates to a protection setting method and a protection releasing method for a portable device, and more particularly, to a protection setting method and a protection releasing method for increasing security of a portable device.

BACKGROUND OF THE INVENTION

Nowadays, except a PIN lock function, most lock functions of a mobile phone, such as a phone lock function, a SIM card lock function, a network lock function and so on, have no limit on the number of times for entering a password. Because of no number limit, anyone can unlock the function by way of trying every possible password. As a result, security levels of the lock functions with no number limit are very low.

SUMMARY OF THE INVENTION

In view of the foregoing issues, one object of the invention is to provide a protection setting method and a protection releasing method for a portable device. The protection setting method and the protection releasing method are capable of increase security of the portable device, so as to solve the problem mentioned above.

The present invention discloses a protection setting method for a portable device. The protection setting method comprises: selecting a lock function having a first unlocking condition; displaying a protection condition list comprising a plurality of protection conditions; selecting a protection condition from the plurality of protection conditions; and setting the selected protection condition as a second unlocking condition of the lock function.

The present invention discloses a protection releasing method for a portable device, which is locked by a lock function having a first unlocking condition and a second unlocking condition. The protection releasing method comprises: detecting whether a first releasing input matches with the first unlocking condition, detecting whether a second releasing input matches with the second unlocking condition, and determining whether to release locking of the portable device according to whether the first and the second unlocking conditions are matched with.

The present invention discloses a protecting releasing method for a portable device, which is locked by a lock function having a first unlocking condition and a second unlocking condition. The protection releasing method comprises: displaying a password input window for entering a first unlocking input, detecting a second unlocking input, verifying whether the second unlocking input matches with the second unlocking condition, and verifying whether the first unlocking input matches with the second unlocking condition.

DETAILED DESCRIPTION OF THE PREFERRED EMBODIMENT

The present invention relates to a protection setting method and a protection releasing method for a portable device, wherein the protection setting method and the protection releasing method are capable of increasing security of the portable device. The description illustrates embodiments of the protection setting method and the protection releasing method applied in the present invention. However, a person having ordinary skill in the art shall understand that the protection setting method and the protection releasing method of the present invention can be applied in all types of similar portable devices, and the invention need not be limited to the embodiments or particular methods to implement technical characteristics of the embodiments mentioned below in the description.

Generally, the protection setting method and the protection releasing method disclosed in the present invention can be applied in all types of portable devices. A protection setting method and a protection releasing method applied in a mobile phone are disclosed in the description for example. However, the example shall not be construed as limiting the claims.

Figure 1:
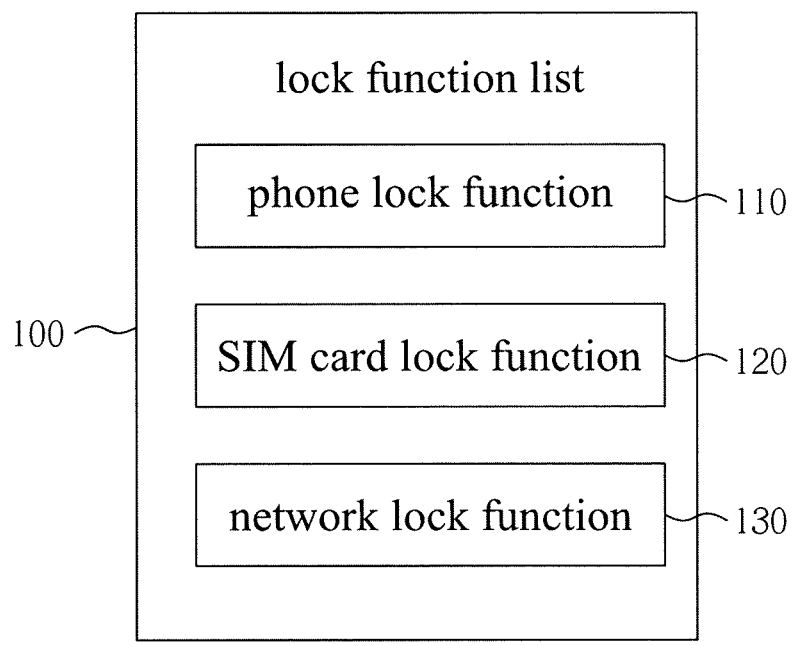
FIG. 1 shows a schematic diagram of a lock function list in accordance with a preferred embodiment of the present invention.
Figure 2:
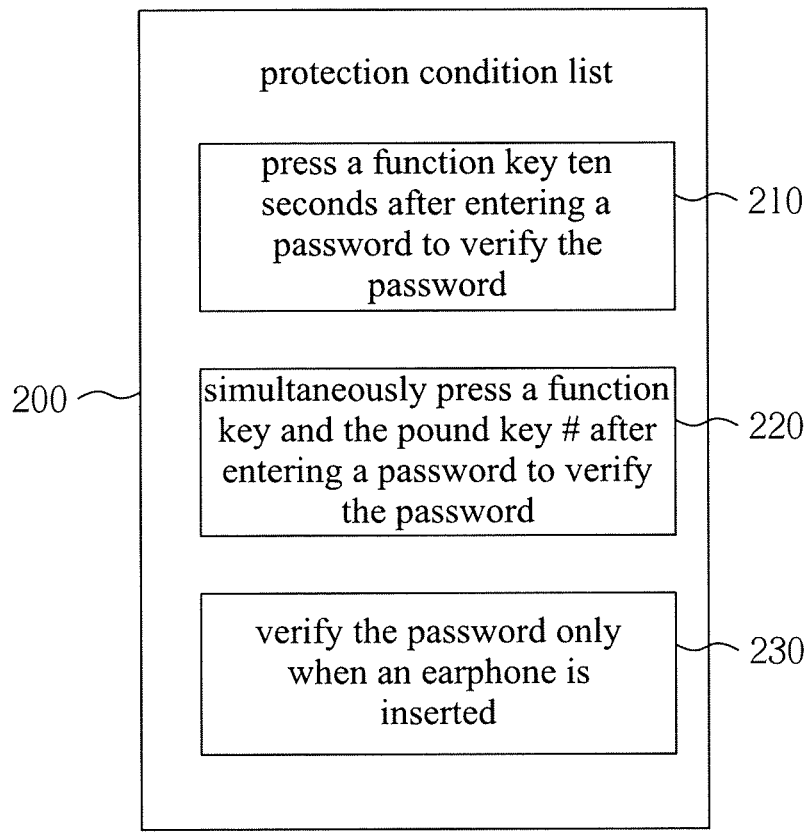
FIG. 2 shows a schematic diagram of a protection condition list in accordance with a preferred embodiment of the present invention.

In a first embodiment of the present invention, the protection setting method disclosed by the present invention is implemented to a mobile phone. When setting a lock function of the mobile phone, a lock function list is shown on a display of the mobile phone according to the protection setting method of the present invention. The lock function list comprises a plurality of lock functions, each of which has a corresponding first lock releasing condition. For example, referring to FIG. 1 showing a schematic diagram of a lock function list 100 in accordance with an embodiment of the present invention, the lock function list 100 comprises a phone lock function 110, a SIM card lock function 120 and a network lock function 130. A lock function having a first lock releasing condition is then selected from the plurality of lock functions, followed by setting at least a second lock releasing condition with respect to the selected lock function. Setting the second lock releasing condition with respect to the selected lock function comprises steps of: displaying a protection condition list having a plurality of protection conditions, selecting a protection condition from the plurality of protection conditions, and setting the protection condition as the second lock releasing condition of the lock function. For example, referring to FIG. 2 showing a schematic diagram of a protection condition list 200 in accordance with an embodiment of the present invention, the protection condition list 200 comprises: an option 210 of pressing a function key ten seconds after entering a password to verify the password, an option 220 of simultaneously pressing a function key and the pound key # after entering a password to verify the password, and an option 230 of verifying the password only when an earphone is inserted. It is to be noted that, the embodiment mentioned above is taken as an example of the present invention, and it shall not be construed as limiting of the present invention. For example, the present invention can be applied to the mobile phone to provide an interface offering user-defined protection conditions as desired by the user.

The second lock releasing condition (protection condition) is different from the first lock releasing conditions. The second lock releasing condition is not a password composed of characters or numbers, but is a particular condition. For example, the particular condition is "pressing a function key ten seconds after entering a password of the first lock releasing condition to verify the password." Therefore, while the mobile phone is locked, the mobile phone becomes unlocked when the lock releasing input entered by the user matches with the particular condition as well as the password of the first lock releasing condition. It is to be noted that, when a lock releasing input received by the mobile phone does not match with the second lock releasing condition, the mobile phone remains locked. In addition, the protection setting method according to the invention may be designed as, when the lock releasing input received by the mobile phone does not match with the second lock releasing condition, the mobile phone does not even proceed with verification of the first lock releasing condition to keep locking the mobile phone.

Figure 3:
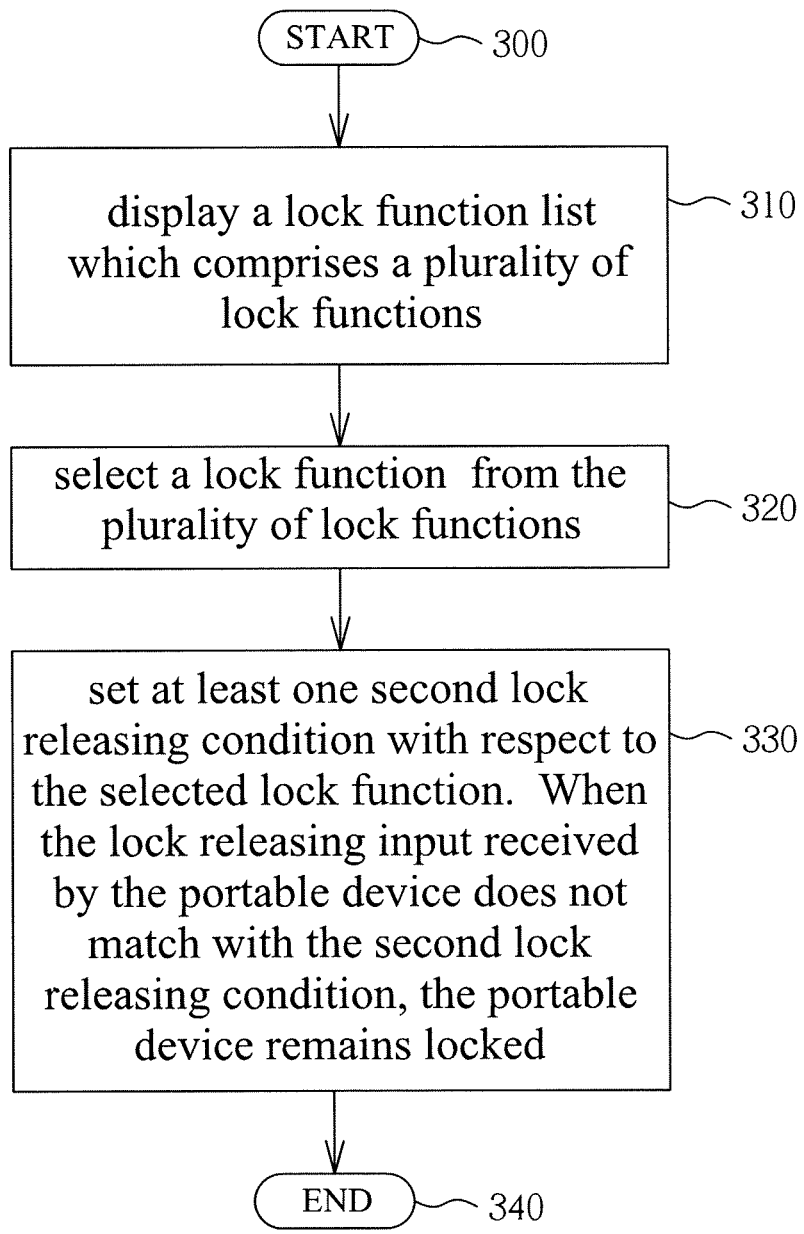
FIG. 3 shows a flow chart of a protection setting method for a portable device in accordance with a first preferred embodiment of the present invention as mentioned above.

Refer to FIG. 3 showing a flow chart of a first embodiment of a protection setting method disclosed in the present invention according to the operation method mentioned above. The steps in the flow chart need not be executed as the sequence shown in FIG. 3 nor be successive, if the same result is substantially achieved. That is to say, the steps in FIG. 3 can be interleaved with other steps. The protection setting method of the present invention comprises steps below. The method starts with Step 300. In Step 310, a lock function list is displayed. The lock function list comprises a plurality of lock functions, each of which has a corresponding first lock releasing condition. In Step 320, a lock function is selected from the plurality of lock functions. In Step 330, at least one second lock releasing condition with respect to the selected lock function is set. When the lock releasing input received by the portable device does not match with the second lock releasing condition, the portable device remains locked. The method ends with step 340.

In addition, Step 330 further comprises steps below. In Step 332, a protection condition list comprising a plurality of protection conditions is displayed. And in Step 334, a protection condition from the plurality of protection conditions is selected and set as the second lock releasing condition of the lock function.

When the mobile phone is locked by a started lock function via the protection setting method in accordance with the first embodiment of the present invention by the user, the lock function has at least one first lock releasing condition and one second lock releasing condition. When the protection releasing method in accordance with the first embodiment of the present invention is used for releasing the lock of the mobile phone by the user, a password input window is shown on the display of the mobile phone by the protection setting method in accordance with the first embodiment of the present invention, so as to allow the user to enter a first lock releasing input. It is to be noted that, the display of the mobile phone does not show any information related to the second lock releasing condition. Next, a second lock releasing input is detected to verify whether the second lock releasing input matches with the second lock releasing condition. If the answer is no, the mobile phone remains locked and the password input window is shown on the display of the mobile phone again. If the second lock releasing input matches with the second lock releasing condition, the protection setting method of the present invention keeps verifying whether the first lock releasing input matches with the first lock releasing condition, and if the answer is yes, the portable device becomes unlocked.

For example, when a mobile phone is locked by the lock function mentioned above and the second lock releasing condition is the option 210 of pressing a function key ten seconds after entering a password to verify the password, if the user immediately presses the function key after entering the password instead of waiting for ten seconds, the mobile phone remains locked even if the password is correct. Therefore the user needs to wait for ten seconds to press the function key after entering the correct password to verify the password in order to release locking of the mobile phone. As a result, a person having ordinary skill in the art thoroughly understands the protection setting method and the protection releasing method disclosed in the present invention are capable of increasing the security of the mobile phone.

Figure 4:
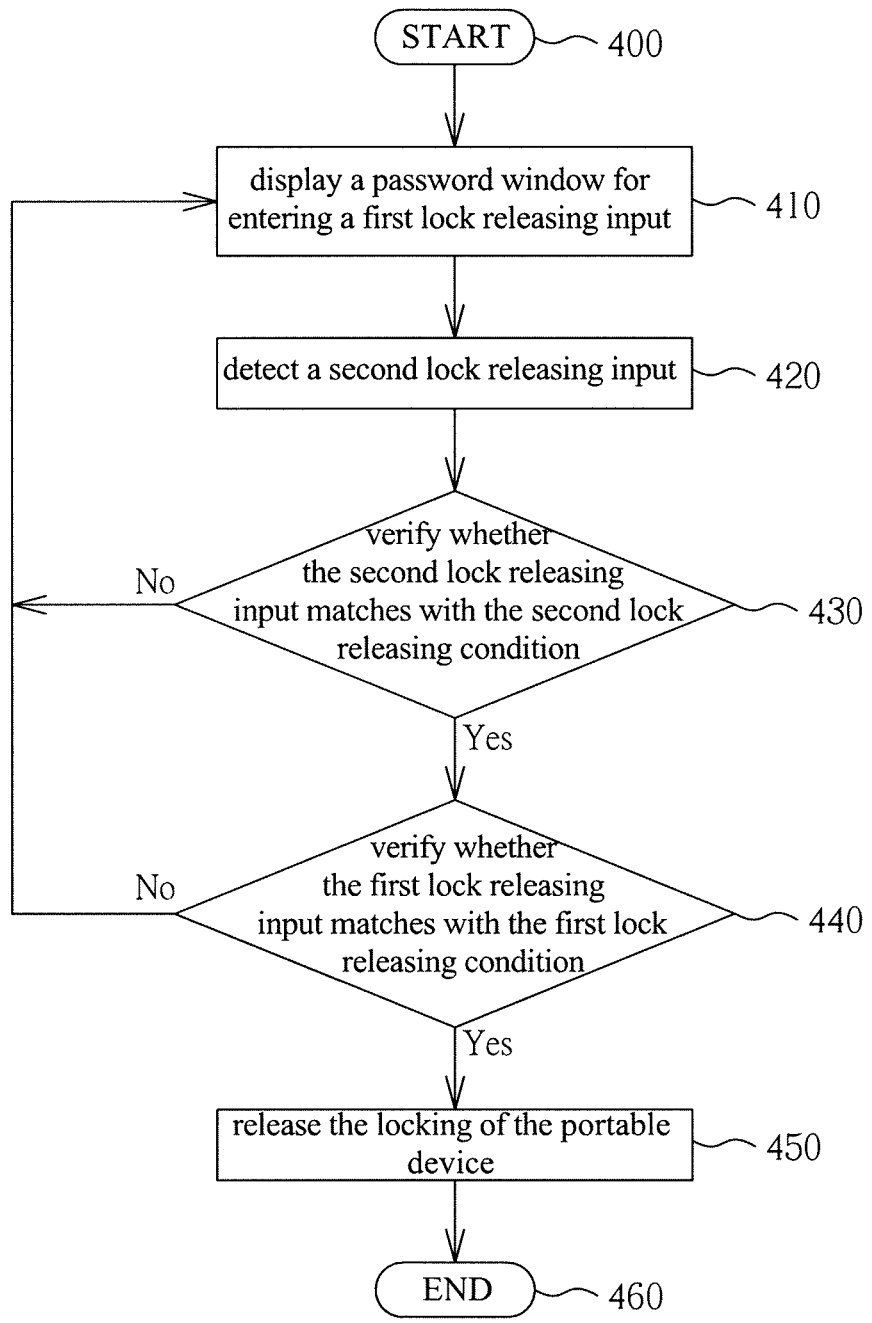
FIG. 4 shows a flow chart of a first embodiment of a protection releasing method disclosed in the present invention according to the operation method mentioned above.

Referring to FIG. 4 showing a flow chart of a first embodiment of a protection releasing method disclosed in the present invention according to the operation method mentioned above. The steps in the flow chart need not be executed as the sequence shown in FIG. 4 nor be successive, provided the same result is substantially achieved; that is to say, the steps in FIG. 4 can be interleaved with other steps. The protection setting method of the present invention comprises following steps. The method starts with Step 400. In Step 410, a password input window for entering a first lock releasing input is displayed. In Step 420, a second lock releasing input is detected. In Step 430, whether the second lock releasing input matches with the second lock releasing condition is verified. If the second lock releasing input does not match with the second lock releasing condition, Step 410 is executed. Otherwise, Step 440 is executed. In Step 440, whether the first lock releasing input matches with the first lock releasing condition is verified. If the first lock releasing input does not match with the first lock releasing condition, Step 410 is executed. Otherwise, Step 450 is executed. In Step 450, locking of the mobile phone is released. The method ends with Step 460.

In a second embodiment of the present invention, a difference from the first embodiment is that the second lock releasing condition has a corresponding condition key. In addition to the steps described in the first embodiment, the protection setting method disclosed in the present invention further comprises: determining whether an object of the portable device can be encrypted; and if the object can be encrypted, generating an object key according to the condition key and encrypting the object according to the object key. For example, if a portable device has at least one picture file and one function option, and the user wishes to lock the picture file, the protection setting method according to the invention further comprises steps of: determining whether the picture file can be encrypted, generating an object key according to a condition key corresponding to a selected second lock releasing condition, and encrypting the picture file according to the object key as well as locking the picture file by use of a lock function having the second lock releasing condition. In addition, if the user wishes to lock one function option of the portable device and the function option cannot be encrypted according to the protection setting method, the function option cannot be locked via the second lock releasing condition having a condition key.

Figure 5:
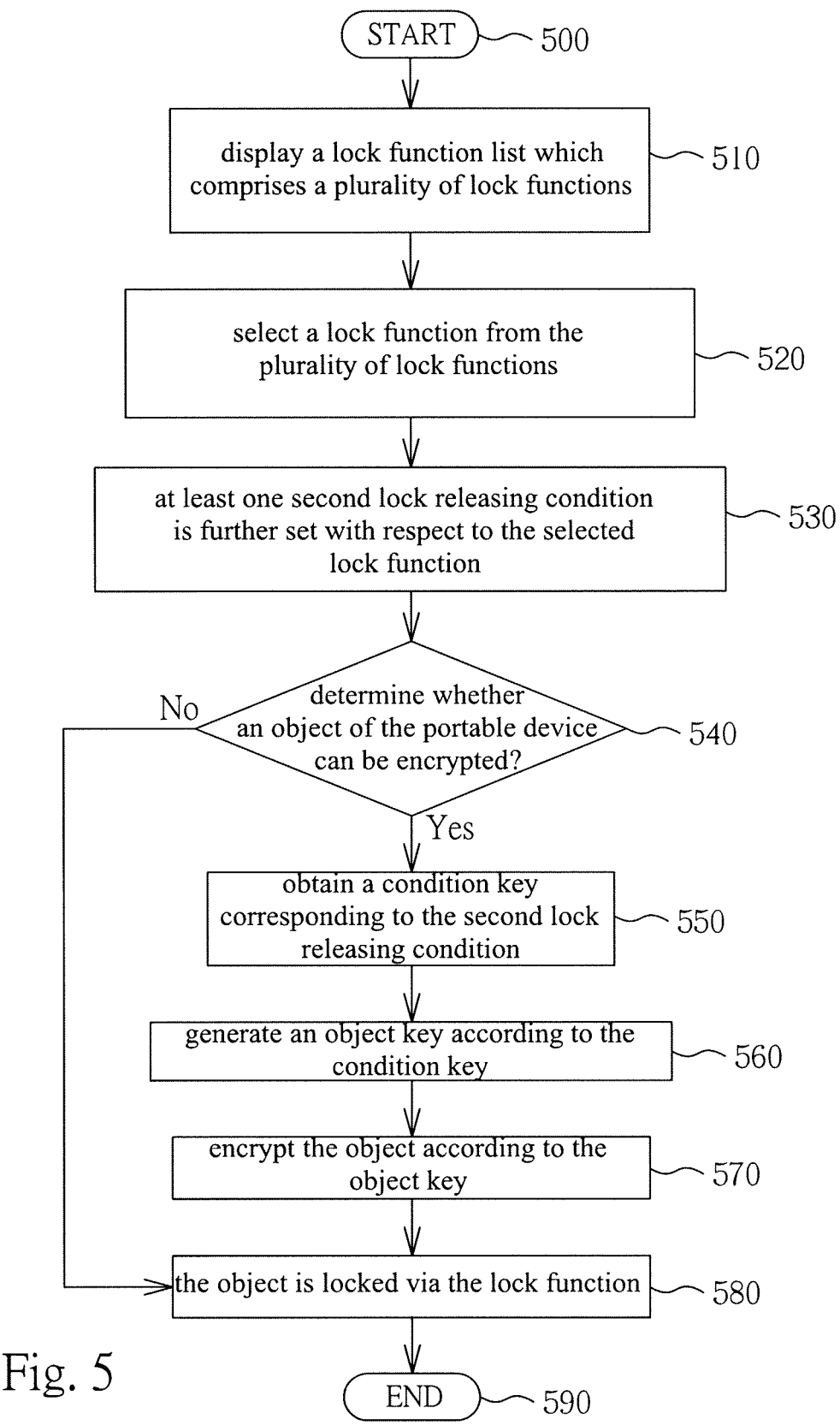
FIG. 5 shows a flow chart of a second embodiment of a protection setting method disclosed in the present invention according to the operation method mentioned above.

Refer to FIG. 5 showing a flow chart of a second embodiment of a protection setting method disclosed in the present invention according to the operation method mentioned above. The steps in the flow chart need not be executed as the sequence shown in FIG. 5 nor be successive, provided the same result is substantially achieved; that is to say, the steps in FIG. 5 can be interleaved with other steps. The protection setting method of the present invention comprises following steps. The method starts with Step 500. In Step 510, a lock function list is displayed. The lock function list comprises a plurality of lock functions, each of which has a corresponding first lock releasing condition. In Step 520, a lock function is selected from the plurality of lock functions. In Step 530, at least one second lock releasing condition is further set with respect to the selected lock function. In Step 540, whether an object of the portable device can be encrypted is determined. If the answer is yes, Step 550 is executed. Otherwise, Step 580 is executed. In Step 550, a condition key corresponding to the second lock releasing condition is obtained. In Step 560, an object key according to the condition key is generated. In Step 570, the object is encrypted according to the object key. In Step 580, the object is locked via the lock function. The method ends with Step 590.

Moreover, if the foregoing portable device is a mobile phone and the portable device has an International Mobile Equipment Identity (IMEI) code, Step 550 of the protection setting method in the second embodiment of the present invention is changed to obtaining a condition key corresponding to the second lock releasing condition and the IMEI code of the mobile phone; Step 560 is changed to generating an object key according to the condition key and the IMEI code. Note that other steps are not changed.

Steps for decrypting the encrypted object by the protection setting method according to the second embodiment of the invention shall be described. According to the protection setting method in the second embodiment of the invention, the portable device is locked by a lock function and an object of the portable device is encrypted according to an object key, the lock function has at least one first lock releasing condition and one second lock releasing condition. To release locking of the portable device and decrypt the object, a password input window is shown on the display of the potable device to allow the user to enter a first lock releasing input. It is to be noted that, any information concerning the second lock releasing condition is not shown on the display of the portable device. A second lock releasing input is then detected. Next, whether the second lock releasing input matches with the second lock releasing condition is verified. If the second lock releasing input does not match with the second lock releasing condition, the portable device remains locked and the password input window is shown on the display of the portable device again. If the second lock releasing input matches with the second lock releasing condition, whether the first lock releasing input matches with the first lock releasing condition is verified, and if the answer is yes, the portable device becomes unlocked. That is to say, the protection releasing method of the present invention comprises steps of: detecting whether the first lock releasing input matches with the first lock releasing condition, detecting whether the second lock releasing input matches with the second lock releasing condition, and determining whether to release locking of the portable device according to whether the first and the second lock releasing conditions are matched with. Wherein, if the second lock releasing input does not match the second lock releasing condition, the portable device remains locked. Further, to access the object, a condition key corresponding to the second lock releasing condition for generating the object key used to decrypt the object is obtained by the protection releasing method in accordance with the second embodiment of the present invention.

For example, when a portable device has an encrypted picture file and the picture file is locked by a lock function mentioned above, and the second lock releasing condition of the lock function is the option 210 of pressing a function key ten seconds after entering a password to verify the password, if the user immediately presses the function key to verify the password after entering the password instead of waiting for ten seconds, the mobile phone remains unlocked even if the password is correct. Therefore the user needs to wait for ten seconds after entering the password to press the function key to verify the password and the password needs to be correct, so as the locking of the portable device can be released. Next, when the user successfully releases locking of the portable device, the protection releasing method in accordance with the second embodiment of the present invention obtains a condition key corresponding to the second lock releasing condition, and then an object key for decrypting the picture file is generated according to the condition key. Therefore, a person having ordinary skill in the art can thoroughly understands that the protection setting method and the protection releasing method disclosed in the present invention are capable of increasing the security of the mobile phone and the security of various files of the portable device. That is to say, the encrypted file moved outside the portable device cannot be read. As a result, difficulty of accessing to various files of the portable device is increased.

Figure 6:
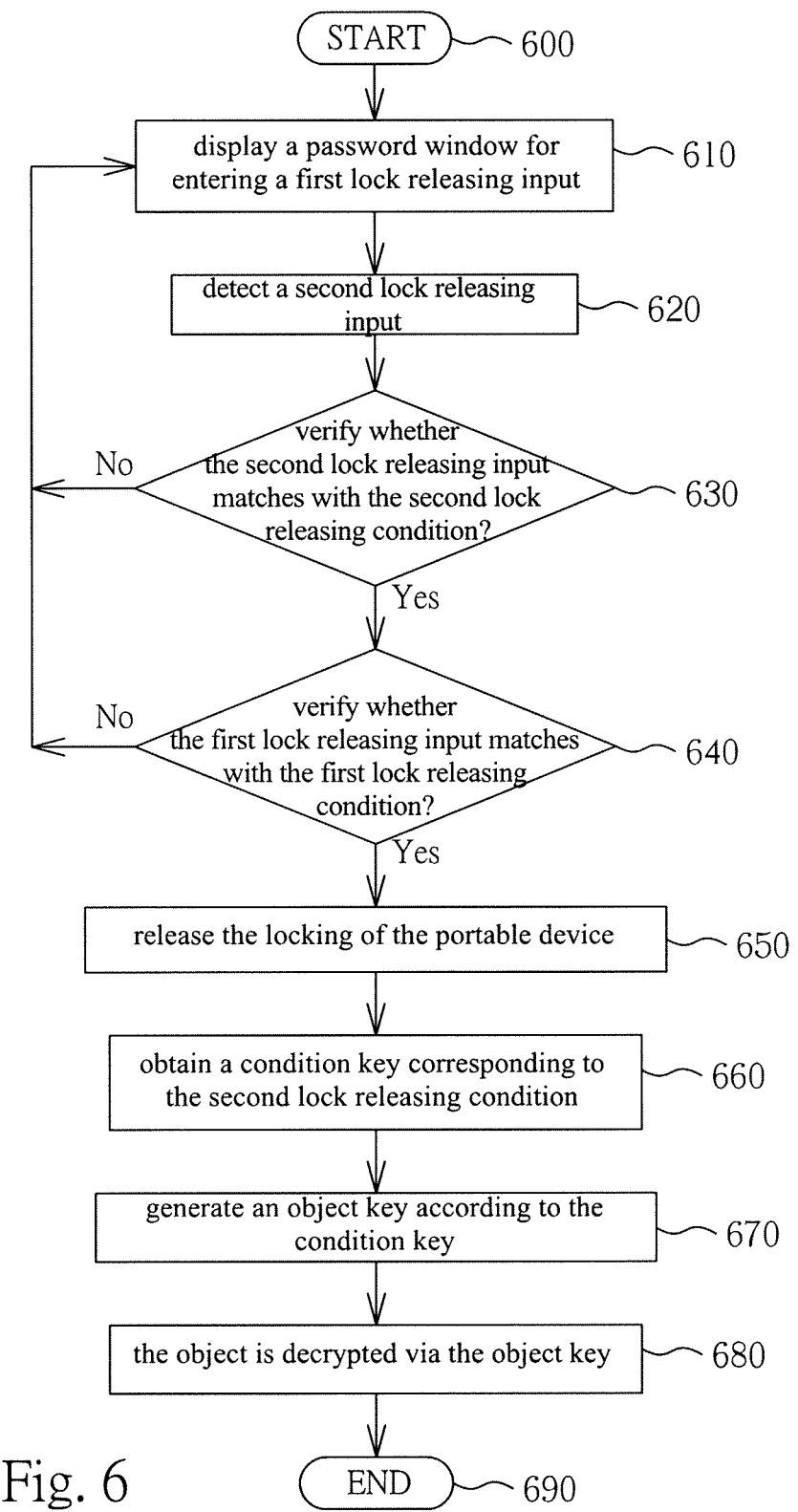
FIG. 6 shows a flow chart of a second embodiment of a protection setting method disclosed in the present invention according to the operation method mentioned above.

Referring to FIG. 6 showing a flow chart of a second embodiment of a protection setting method disclosed in the present invention according to the operation method mentioned above. The steps in the flow chart need not be executed as the sequence shown in FIG. 6 nor be successive, provided the same result is substantially achieved; that is to say, the steps in FIG. 6 can be interleaved with other steps. The protection releasing method of the present invention comprises following steps. The method starts with Step 600. In Step 610, a password input window for entering a first lock releasing input is displayed. In Step 620, a second lock releasing input is detected. In Step 630, whether the second lock releasing input matches with the second lock releasing condition is verified. If the second lock releasing input does not match with the second lock releasing condition, Step 610 is executed. Otherwise, Step 640 is executed. In Step 640, whether the first lock releasing input matches with the first lock releasing condition is verified. If the first lock releasing input does not match with the first lock releasing condition, Step 610 is executed. Otherwise, Step 650 is executed to release the locking of the portable device. In Step 660, a condition key corresponding to the second lock releasing condition is obtained; if the condition key fails to be obtained, Step 610 is executed or obtainment failure information is shown. In Step 670, an object key according to the condition key is generated. In Step 680, the object is decrypted via the object key; if the object fails to be decrypted via the object key, Step 610 is executed or decryption failure information is shown. The method ends with Step 690.

Furthermore, if the foregoing portable device is a mobile phone and the portable device has an IMEI code, Step 660 of the protection setting method is changed to obtaining a condition key corresponding to the second lock releasing condition and the IMEI code of the mobile phone, and Step 670 is changed to generating an object key according to the condition key and the IMEI code. Note that other steps are not changed.

The preferred embodiments of the present invention are disclosed as above. Other variations and modifications will be apparent to persons skilled in the art within the spirit and scope of the appended claims which are to be accorded with the broadest interpretation so as to encompass all such modifications and similar structures.

What is claimed is:

1. A protection setting method for a portable device, comprising steps of:
    selecting a lock function having a first unlocking condition;
    displaying a protection condition list comprising a plurality of protection conditions;
    selecting a protection condition from the plurality of protection conditions; and
    setting the selected protecting condition as a second unlocking condition of the lock function,
    wherein after the portable device is locked by the lock function, the portable device shows an unlocking input window corresponding to the first unlocking condition when unlocking the lock function, but the portable device does not provide any indication concerning the second unlocking condition,
    wherein the second unlocking condition is other than text-based and has a corresponding condition key, and wherein the first unlock condition is verified after the second unlocking condition is satisfied, and the protection setting method further comprises steps of:
    determining whether an object of the portable device can be encrypted; and
    encrypting the object according to the condition key if the object can be encrypted.

2. The protection setting method as claimed in claim 1, wherein the step of selecting the lock function comprises:
    displaying a lock function list comprising a plurality of lock functions, each of the plurality of lock functions having a corresponding unlocking condition; and
    selecting the lock function from the plurality of lock functions.

3. The protection setting method as claimed in claim 1, wherein the portable device is a mobile phone having an International Mobile Equipment Identity (IMEI) code, and the protection setting method further comprises:
    generating an object key according to the condition key and the IMEI code and encrypting the object according to the object key if the object can be encrypted.

4. A protection releasing method for a portable device, the portable device being locked by a lock function with a first unlocking condition and a second unlocking condition, the protection releasing method comprising steps of:
    displaying an unlocking input window corresponding to the first unlocking condition;
    detecting, from the unlocking input window, a first unlocking input for determining whether the first unlocking input matches with the first unlocking condition;
    detecting, without providing to a user any indication concerning the second unlocking condition, a second unlocking input for determining whether the second unlocking input matches with the second unlocking condition;
    determining whether the second unlocking input matches with the second unlocking condition;
    determining whether to release locking of the portable device according to whether the first unlocking input matches with the first unlocking condition after the second unlocking input is matched with the second unlocking condition,
    wherein an object of the portable device is encrypted by an object key, the second unlocking condition is other than text-based and has a corresponding condition key, and the protection releasing method further comprises steps of:
    determining whether the first and the second unlocking conditions are matched with when accessing the object; and
    obtaining the condition key for generating the object key and decrypting the object via the object key if the first and the second unlocking conditions are matched with.

5. The protection releasing method as claimed in claim 4, wherein the portable device is a mobile phone having an IMEI code, and the protection releasing method further comprises:
    obtaining the condition key and the IMEI code for generating the object key and decrypting the object via the object key if the first and the second unlocking conditions are matched with.

6. The protection releasing method as claimed in claim 4, wherein the portable device detects whether the first unlocking condition is matched with after the second unlocking condition is matched with.

7. A protection releasing method for a portable device, the portable device being locked by a lock function with a first unlocking condition and a second unlocking condition, the protection releasing method comprising steps of:
    displaying a password input window for entering a first unlocking input;
    detecting, without providing to a user any indication concerning the second unlocking condition, a second unlocking input;
    verifying whether the second unlocking input matches with the second unlocking condition; and
    verifying whether the first unlocking input matches with the first unlocking condition after the second unlocking input has been verified,
    wherein an object of the portable device is encrypted by an object key, the second unlocking condition is other than text-based and has a corresponding condition key, and the protection releasing method further comprises steps of:
    determining whether the second unlocking input matches with the second unlocking condition and determining whether the first unlocking input matches with the first unlocking condition after the second unlocking input matches the second unlocking condition when accessing the object; and
    obtaining the condition key for generating the object key and decrypting the object via the object key if the first and the second unlocking conditions are matched with.

8. The protection releasing method as claimed in claim 7, wherein the portable device is a mobile phone having an IMEI code, and the protection releasing method further comprises:
    obtaining the condition key and the IMEI code for generating the object key and decrypting the object via the object key if the first and the second unlocking conditions are matched with.

* * * * *